(12) United States Patent
Church et al.

(10) Patent No.: US 10,162,339 B2
(45) Date of Patent: Dec. 25, 2018

(54) AUTOMATED MANUFACTURING USING MODULAR STRUCTURES AND REAL TIME FEEDBACK FOR HIGH PRECISION CONTROL

(71) Applicant: SCIPERIO, INC, Orlando, FL (US)

(72) Inventors: Kenneth H. Church, Orlando, FL (US); Paul Deffenbaugh, Orlando, FL (US); Josh Goldfarb, Melbourne, FL (US); Charles Michael Newton, Grant, FL (US); Michael W. Owens, Orlando, FL (US)

(73) Assignee: Sciperio, Inc, Orlando, FL (US)

( * ) Notice: Subject to any disclaimer, the term of this patent is extended or adjusted under 35 U.S.C. 154(b) by 34 days.

(21) Appl. No.: 15/093,871

(22) Filed: Apr. 8, 2016

(65) Prior Publication Data

US 2016/0299494 A1    Oct. 13, 2016

Related U.S. Application Data

(60) Provisional application No. 62/144,379, filed on Apr. 8, 2015.

(51) Int. Cl.
*G05B 19/4099* (2006.01)
*G05B 19/414* (2006.01)

(52) U.S. Cl.
CPC .. *G05B 19/414* (2013.01); *G05B 2219/31261* (2013.01); *G05B 2219/40293* (2013.01); *G05B 2219/50158* (2013.01); *G05B 2219/50228* (2013.01); *Y02P 90/08* (2015.11)

(58) Field of Classification Search
CPC  G05B 15/02; G05B 19/4099; G05B 19/4148; G05B 2219/49023
See application file for complete search history.

(56) References Cited

U.S. PATENT DOCUMENTS

| 5,044,844 A | 9/1991 | Backhouse |
| 5,163,793 A | 11/1992 | Martinez |
| 6,873,880 B2 | 3/2005 | Hooke et al. |
| 2002/0161469 A1* | 10/2002 | Faulkner ............ G05B 19/4099 700/118 |
| 2004/0003738 A1* | 1/2004 | Imiolek ................. B22F 3/1055 101/480 |

(Continued)

OTHER PUBLICATIONS

International Search Report (dated Jul. 1, 2016).
Written Opinion (dated Jul. 1, 2016).

*Primary Examiner* — Yuhui R Pan
(74) *Attorney, Agent, or Firm* — Goodhue, Coleman & Owens, P.C.

(57) ABSTRACT

An apparatus includes a rigid frame or girder system, a first computer controlled motion system associated with the rigid frame or girder system and configured to move in coordinated positions, a second computer controlled motion system associated with a part to be worked on and configured to move in coordinated positions, and a plurality of sensors associated with the first motion system and the second motion system. The first computer controlled motion system and the second computer controlled motion system use information from the plurality of sensors to assist in coordination between the first computer controlled motion system and the second computer controlled motion system.

18 Claims, 4 Drawing Sheets

(56) References Cited

U.S. PATENT DOCUMENTS

| | | | |
|---|---|---|---|
| 2005/0280185 A1* | 12/2005 | Russell | B28B 1/001 264/308 |
| 2009/0283949 A1* | 11/2009 | Brown | B25J 9/1015 269/58 |
| 2011/0037212 A1 | 2/2011 | Marrinan | |
| 2012/0130528 A1* | 5/2012 | Stark | B23P 19/10 700/114 |
| 2012/0248082 A1* | 10/2012 | O'Connell | B23K 9/02 219/17 R |
| 2014/0222373 A1* | 8/2014 | Sprenger | G01B 21/045 702/155 |

* cited by examiner

AUTOMATED MANUFACTURING USING MODULAR STRUCTURES AND REAL TIME FEEDBACK FOR HIGH PRECISION CONTROL

RELATED APPLICATIONS

This application claims priority to U.S. Provisional Patent Application No. 62/144,379, filed Apr. 8, 2015, hereby incorporated by reference in its entirety.

FIELD OF THE INVENTION

The present invention relates to manufacturing technology. More particularly, but not exclusively, the present invention relates to automated manufacturing using modular structures and real time feedback for high precision control.

BACKGROUND OF THE INVENTION

Manufacturing precision components is done with exceptional control and either post process characterization or in situ characterization or both. This works well for smaller parts such as electronics or precision mechanical parts that require tight tolerances. For larger structures it is challenging or even not possible to make very large objects with exceptional precision. To accommodate this today, smaller parts are made with precision and then assembled and tolerance tested and adjusted until the large object meets specifications. In many cases, not all of the large object needs to be made with high precision, but there are key components within the large object and this is challenging to achieve given the overall size.

Large or very large is subjective, for example depending on the level of precision needed. Large objects that measure large fractions of a meter to many meters are very large if micron precision is required over the entire object. Methods exist to move in submicron, measure in submicron, add in submicron or subtract in submicron, but these methods are not necessarily compatible for large or very large objects.

Large motion control that can cover many meters with submicron accuracies is challenging to the point of unrealistic from a cost point of view. What is described here combines very large motion and standard adding, subtracting, cutting and polishing with very high precision requirements by utilizing real time feedback and adjustments. Using standard rigid frames or girders that can be assembled to adjustable lengths, widths and heights and putting a motion control on this structure, it is possible to put a gantry or other configuration, system together and move an object in coordinated XYZ positions under computer control. The rigid frame or girder structures can range from a large fraction of a meter to 10's of meters or even 100's of meters using standard rigid frame or girder technology. The modular approach may use standard rigid beam structure sizes. These standard sizes may be small standards for sub meter structures, medium standards for meter to tens of meter structures and large standards for more than 100 meter structures. The beam structures can be bolted together and held with supporting angle and horizontal plates to increase strengths and joints. The length, width and height of the structure will depend on the application or the object beneath it to be manufactured.

Once the structure is built, a motion system may be placed on top, this motion system can be a variety of mechanisms to move in XY and Z. The mechanisms can be belt drives, ball screw drives, linear motor drives or any mechanism that moves under computer control. The motion may be controlled with a multi-axis controller. The precision at which this system will operate will be with large tolerances that can vary from hundreds of microns for the smaller large structures to many millimeters to the very large structures. Precision manufacturing requirements can be 100 to 100,000 times more demanding.

When the large gantry system moves an object, the path for which the motion is asked to move is done with exact precision and accuracy in the computer. The reality is the motion will be significantly less accurate during the move. Feedback in linear motors motion systems utilize tape scale feedback with nanometer resolution thus providing the system a closed loop method for the object to reach the target and to do this with the most precise path during motion. The system constantly checks and adjusts its path during motion. Many meters of tape scale is expensive and must be calibrated at factory during the manufacturing process of the system and the system is not modular nor scalable.

Therefore, what is needed are improved manufacturing methods and apparatus.

SUMMARY

Therefore, it is a primary object, feature, or advantage of the present invention to improve over the state of the art.

It is a further object, feature, or advantage of the present invention to provide for automated manufacturing using modular structures.

It is a still further object, feature, or advantage of the present invention to provide real-time feedback for high precision control.

Another object, feature, or advantage of the present invention is to providing manufacturing technology which is scalable.

One or more of these and/or other objects, features, or advantages of the present invention will become apparent from the specification and claims that follow. No single embodiment need exhibit each and every object, feature, or advantage. Different embodiments may have different objects, features, or advantages.

According to one aspect, an apparatus includes a rigid frame or girder system. There is a first computer controlled motion system associated with the rigid frame or girder system which is configured to move in coordinated positions. There is a second computer controlled motion system associated with a part to be worked on. The second computer controlled motion system is configured to move in coordinated positions. There is also sensors which are associated with the first motion system and the second motion system are provided. The apparatus further includes at least one controller operatively connected to the first computer controlled motion system and the second computer controlled motion system. The controller(s) is configured to use information from the plurality of sensors to assist in coordination between the first computer controlled motion system and the second computer controlled motion system such that the information from the sensors is used to locate each of the computer controlled motion systems in real-time and if the computer controlled motion systems have moved out of place, the computer controlled motion systems adjust themselves back into position.

According to another aspect, a method for automated manufacturing using modular structures and real time feedback for high precision control is provided. The method includes providing an apparatus comprising (a) a rigid frame or girder system; (b) a first computer controlled motion system associated with the rigid frame or girder system and configured to move in coordinated positions; (c) a second computer controlled motion system associated with a part to be worked on and configured to move in coordinated positions; (d) a plurality of sensors associated with the first motion system and the second motion system; (e) wherein the first computer controlled motion system and the second computer controlled motion system use information from the plurality of sensors to assist in coordination between the first computer controlled motion system and the second computer controlled motion system. The method further includes sensing data affecting the manufacturing using the plurality of sensors to provide real-time feedback. The method further includes controlling manufacturing using the apparatus using the data such that control is provided in real-time and multiple axes of motion and synchronized motion for one or more processes performed by the first computer controlled motion system and one or more processes performed by the second computer controlled motion system.

DETAILED DESCRIPTION

The present invention provides for utilizing real time feedback to track the object and the objects manufactured part in real time and connect those together as a single unit thus removing the errors induced by the large motion control with enable the large builds to have high precision tolerancing. Tape scales and proximity optical detectors are used in high precision motion control systems. The present invention allows for replacing the tape scales and the proximity sensors with optical, laser, semiconductive, RF, acoustic or any non-contact sensor or combination thereof.

Various different technologies may be used in implementing the methods, apparatus, and systems shown. Examples of such technologies or components are described below.

Detection schemes. Detection schemes may be used that are accurate enough to obtain micron and submicron data such as laser height sensors or CCD cameras with high mag lenses and high resolution pixilation.

Long Distance Detectors. Real time object orientation and calibration may be performed using detectors that operate at long range.

Additive approaches. Additive approaches that can add large and very small quantities of a vast array of materials with the desired material properties.

Subtractive approaches. Subtractive approaches such as milling large area or small area couple with laser milling for large area or small area with submicron surface milling.

Polishing approaches. Polishing approaches using standard mechanical polishing or laser polishing or flame polishing or any polishing technique that is large are or localized for small area.

Processing. Fast processing speeds may be used to handle large amounts of data and multiple data ports for fast data transfer.

Filters. Filters may be used to collect/keep valuable data and remove unwanted data. Sensor fusion or other algorithms may be used to aid in data processing for real time adjustments.

Smaller motion control. Smaller motion control (millimeters×millimeters×millimeters) that is fast enough to counter the 100 micron to millimeter motion offset induced by large system. Large motion offsets are not required but fast offsets are.

Control systems. Control systems that handles the data and the motion and including multiple axis of motion and synchronized motion for multiple processes simultaneously.

Portable rigid structures or girders. Portable rigid structures or girders that can be assembled and provide strength and stability over large distances.

Lasers may be used for proximity distance measurements and then may be fed back to the controller so that the Z height may be adjusted to account for fluctuating Z movements. In addition, a bolometer may be used to observe small areas (hundreds of microns in area) temperatures and this information may fed back to a laser. The power of the laser may then be controlled to maintain a constant temperature on a surface. Thus, the feedback may be used to adjust and more accurately control the distance for milling operations.

Figure 1:
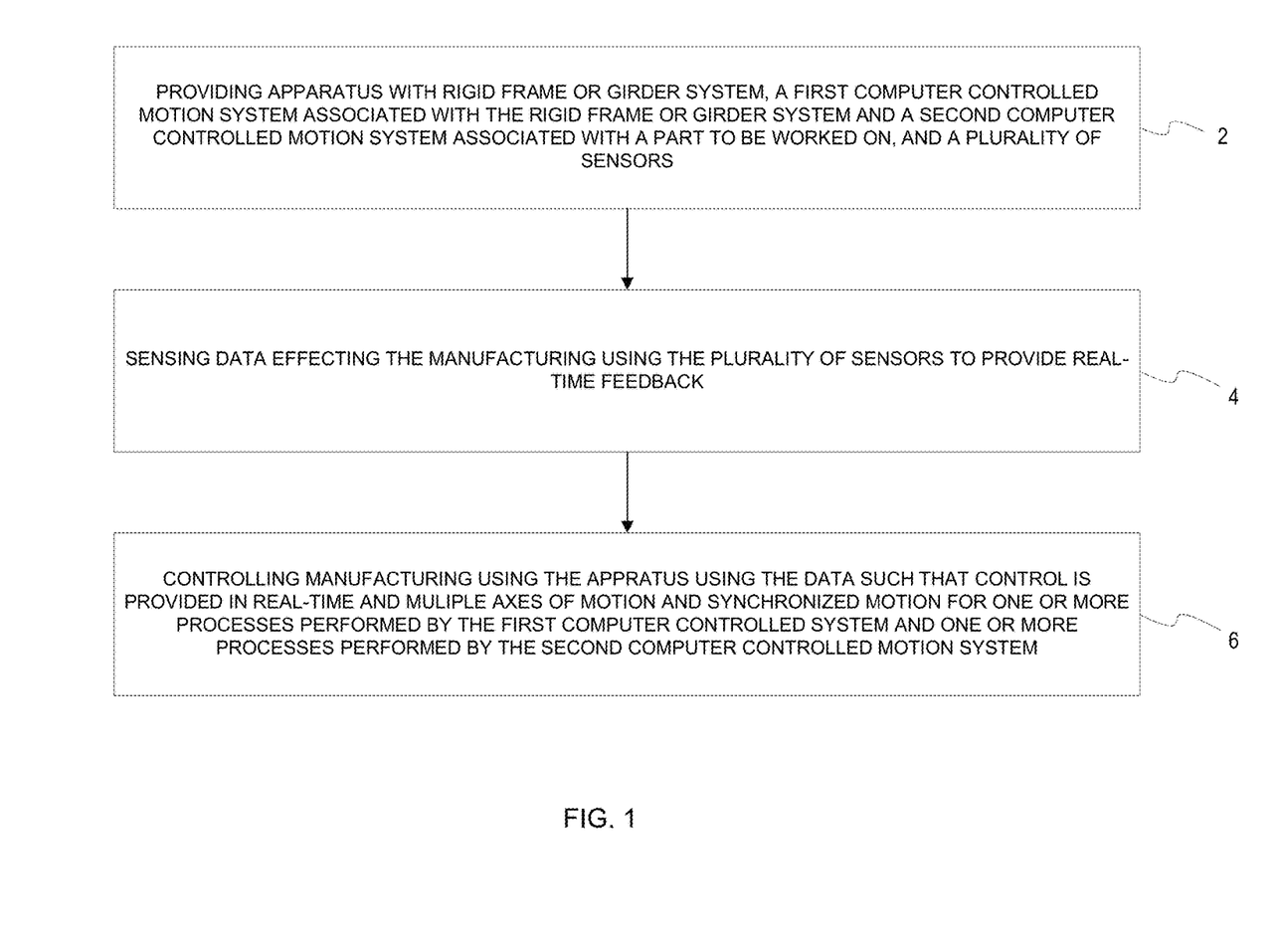
FIG. 1 is a block diagram illustrating various elements.

FIG. 1 illustrates one example of a methodology. In step 2 an apparatus or system is provided which includes a rigid frame or girder system. There is a first computer controlled motion system associated with the rigid frame or girder system. In step 4, data is sensed which effects the manufacturing. The data is sensed using a plurality of sensors to provide real-time feedback. In step 6, the manufacturing is controlled using the apparatus such that control is provided in real-time and with multiple axes of motions and synchronized motion for one or more processes performed by the first computer controlled system and one or more processes performed by the second computer controlled motion system.

Figure 2:
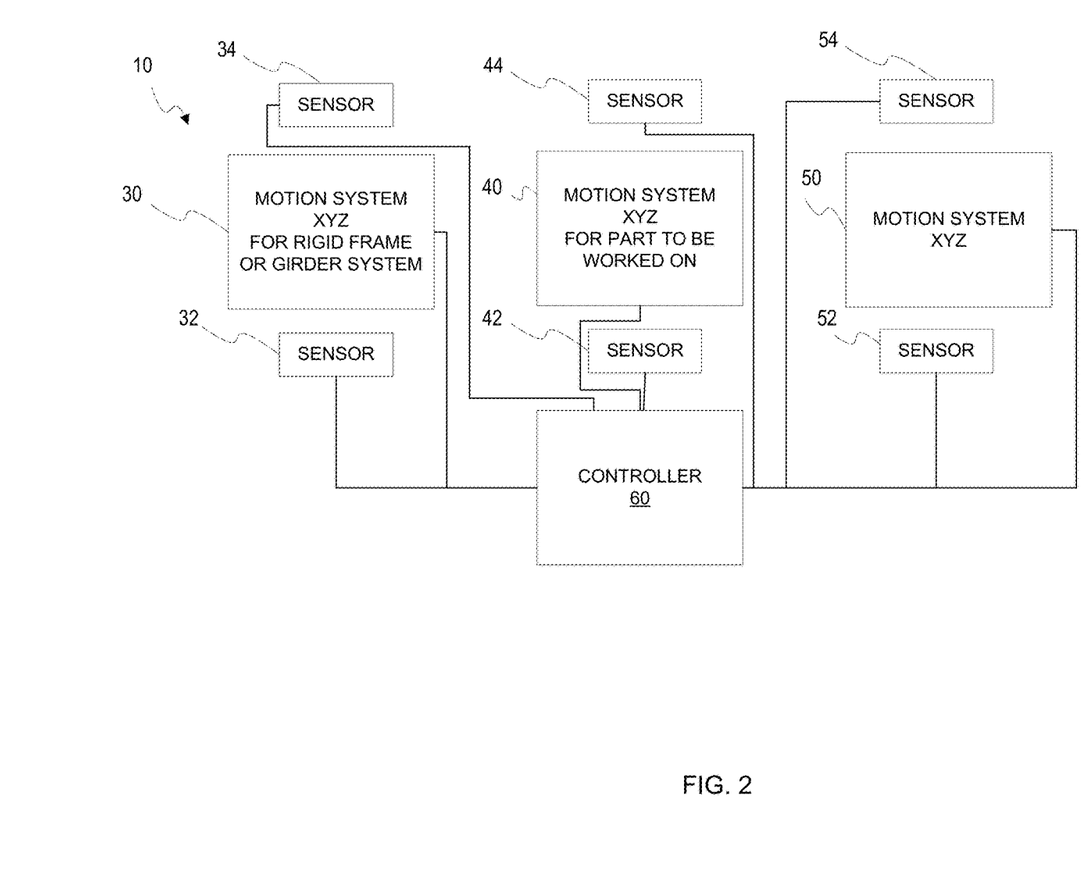
FIG. 2 is a block diagram illustrating an apparatus which includes a plurality of motion systems and a plurality of sensors.

FIG. 2 is a block diagram illustrating one example of a system 10. Note there are separation motion systems shown including a first motion system 30 for a rigid frame or girder system, as second motion system 40 for a part to be worked on, and a third motion system 50. There are a plurality of sensors associated with each motion system including sensors 32, 34 associated with the first motion system 30, sensors 42, 44 associated with the second motion system 40, and sensors 52, 54 associated with the third motion system 50. The sensors associated with each motion sensor are in operative communication with a controller 60. The controller 60 may also be in operative communication with each motion system 30, 40, 50. Note that the sensors are associated with the different motion systems to sense information regarding position, motion, or processes performed, but information from the sensors is communicated to the controller 60.

Figure 3:
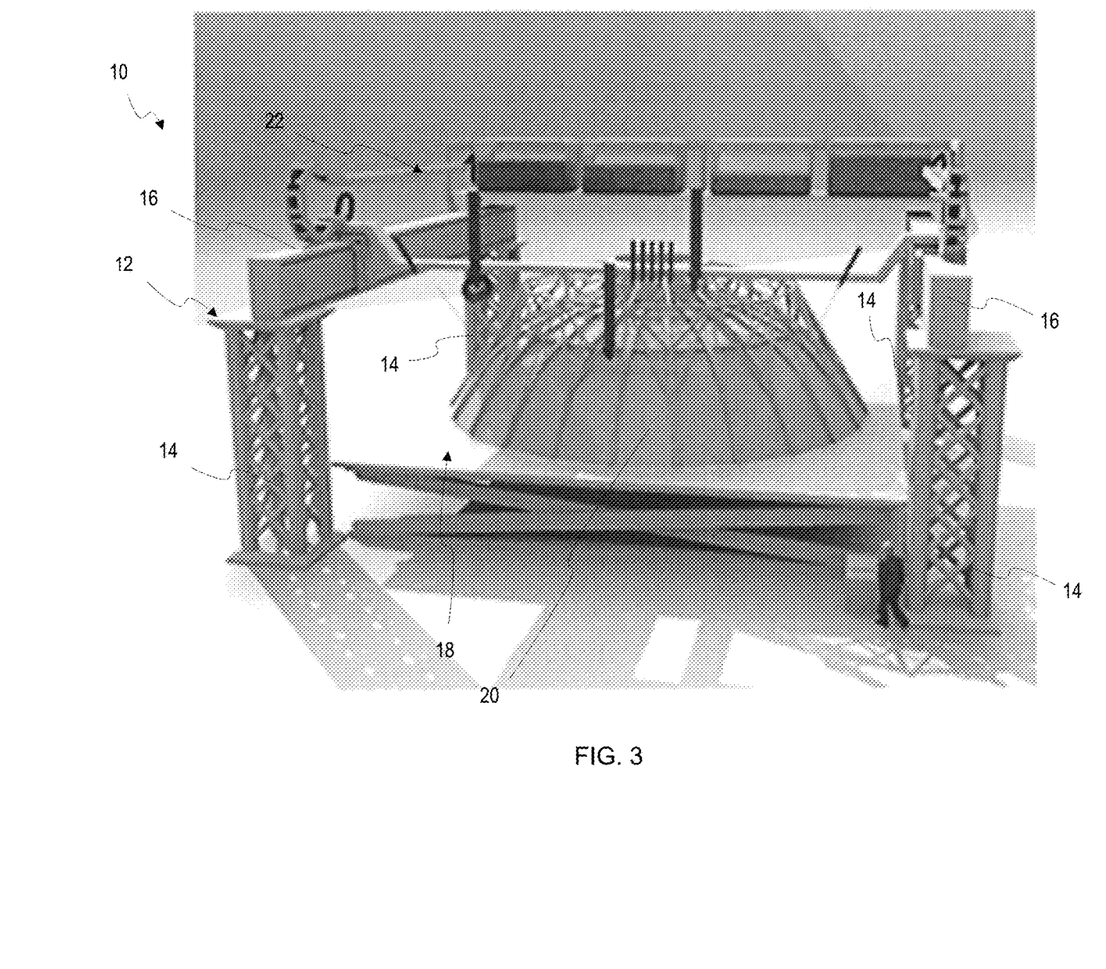
FIG. 3 is a representation of an apparatus which includes a plurality of motion systems and a plurality of sensors.

FIG. 3 illustrates the use of multiple motion systems and associated sensors. Note that the invention is not merely utilizing real time feedback to link two surfaces or objects together such as a milling head and a part, but rather linking two surfaces or objects together in real time for correction using two or three (or more) separate motion control systems. Existing technology has a head that must be held to a specified distance from a part. The part is firmly fixed to a stand or table and many cases these are very rigid and heavy stands or tables such as granite to help remove vibration. The motion holding the head is also fixed to that same sturdy stand or table.

Therefore all parts are tied to the stand and only the head which is moved by the motion is separated. The sensor is attached to the head also which is part of the same motion; there is one motion control system.

The approach here utilizes a separate table or stand that the part resides on. For a very large system 10, the gantry 12 which is comprised of beams or structures 14, 16 is holding a second gantry 22 which holds the head. The part 20 to be worked on (additive, subtractive, polishing, etc.) is on a separate system 18 and can move in XY and Z also. This approach utilizes at least two separate motion systems and up to three or more and ties those together using real time sensor feedback.

The implications of this are making large, very large and ultra large gantry or motion platforms that have very crude motion specifications (hundreds of microns to hundreds of millimeters) and adding a second fast gantry system with extreme precision (nanometers to microns) and using sensors to obtain large area prints with extreme precision tolerances in the prints, the milling, the polishing, the drilling, surface finishing, the additive, the subtractive or any part of an automated manufacturing process.

The sensor set up may be performed with multiple proximity sensors that can detect submicron and also with long distance sensors that can detect micron ranges for placement and orientation. The coupling of several systems will impose offset errors that should be measured and accounted for. Given the need for extreme precision in some of the finishes for some products, the slightest errors can induce failure. The slightest errors can occur because the large gantry has moved and the large gantry has motion tolerances of hundreds of millimeters. Additionally, the part that is sitting on another motion platform, that platform will have motion tolerance errors. Additionally, even if the motion platform holding the part is not moving, vibration can easily surpass the micron tolerance levels. Additionally, temperature fluctuations can cause all motion systems to move on the micron scale and these will all induce error in high precision finishes on new parts being built.

Sensors may be placed strategically throughout and around the two or more motion control systems can provide feedback that will virtually connect the system together with exceptional precision. One example that is similar to this is a transit. A transit measures elevation by setting away from the section of land to be measured. Different locations on the land can be quantified with respect to other locations. The measurement is only as good as the transit accuracy, but this approach works consistently in industry today.

Figure 4:
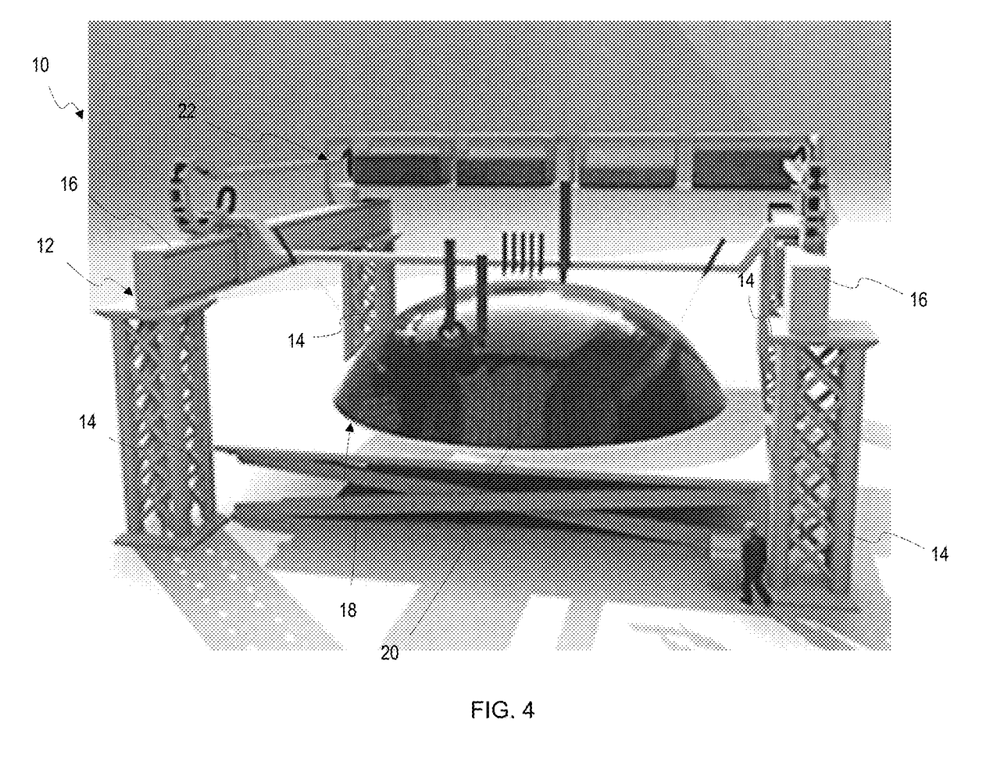
FIG. 4 is another representation of an apparatus which includes a plurality of motion systems and a plurality of sensors.

FIG. 4 illustrates another example of a system 10. The part being made 20 is on a motion platform 18 that is separate from the large gantry 12. The large gantry 12 is separate from the individual motion holding each head thus there are three different motion systems present.

For multiple builds that require precision on certain critical parts, section or surfaces, one may build or print a mold using the system and then print material rapidly with less precision over the top of the mold. An example of this is the dish shown needs to be precise on the surface but the back of the dish does not. A mold may be printed and polished and measured with very precise tolerances and then the dish itself will be printed on it and then separated. Separation is challenging given the vast surface area. Inducing small holes throughout the mold that can force air into the dish will allow the dish to be lifted without damage. This same approach can be utilized for any multi-part needs, size is not prohibited.

Smaller parts that are complex and need precision can be printed utilizing a combination of printing and milling and polishing and a mold can be made of the high tolerance or high polished section and then the part can be printed on the mold much more rapidly and then removed. The mold may be for a one-time use or may be utilized for many or repeat parts.

Therefore, methods and systems for automated manufacturing using modular structures and real time feedback for high precision control have been shown and described. The present invention contemplates numerous options, variations, and alternative embodiments. Therefore, the present invention is not to be limited to the specific examples shown and described herein.

What is claimed:

1. An apparatus comprising:
   first gantry;
   a first computer controlled motion system including the first gantry and configured to move in coordinated positions;
   a second computer controlled motion system holding a part to be worked on and configured to move in coordinated positions;
   a third computer controlled motion system including a second gantry holding a head for working on the part, the first gantry holding the second gantry;
   a plurality of sensors associated with the first motion system and the second motion system;
   at least one controller operatively connected to the first computer controlled motion system, the second computer controlled motion system and the third computer controlled motion system and configured to use information from the plurality of sensors to assist in coordination between the first computer controlled motion system and the second computer controlled motion system such that the information from the sensors is used to locate each of the computer controlled motion systems in real-time and if the computer controlled motion systems have moved out of place, the computer controlled motion systems adjust themselves back into position.

2. The apparatus of claim 1 wherein the at least one controller is a multi-axis controller.

3. The apparatus of claim 1 wherein the plurality of sensors include one or more optical sensors, laser sensors, semiconductive sensors, RF sensors, acoustic sensors or any combinations thereof.

4. The apparatus of claim 1 wherein the second computer controlled motion system comprises a motion platform.

5. The apparatus of claim 1 further comprising a work tool for working on the part.

6. The apparatus of claim 5 wherein the work tool is associated with an additive process.

7. The apparatus of claim 6 wherein the additive process is a 3D printing process.

8. The apparatus of claim 5 wherein the work tool is associated with a subtractive process.

9. The apparatus of claim 8 wherein the subtractive process is a milling process.

10. The apparatus of claim 5 wherein the work tool is associated with a polishing process.

11. The apparatus of claim 2 wherein the at least one controller is configured to use sensor fusion to aid in data processing for real-time adjustments.

12. The apparatus of claim 2 wherein the at least one controller provides for controlling multiple axes of motion and synchronized motion for multiple processes simultaneously.

13. A method for automated manufacturing using modular structures and real time feedback for high precision control, the method comprising:
proving an apparatus comprising (a) first gantry; (b) a first computer controlled motion system including the first pantry and configured to move in coordinated positions; (c) a second computer controlled motion system holding a part to be worked on and configured to move in coordinated positions; (d) a third computer controlled motion system including a second pantry holding a head for working on the part, the first pantry holding the second pantry (e) a plurality of sensors associated with the first motion system, the second motion system, and the third motion system; (e) wherein the first computer controlled motion system, the second computer controlled motion system, and the third computer controlled motion system use information from the plurality of sensors to assist in coordination between the first computer controlled motion system, the second computer controlled motion system, and the third computer controlled motion system;
sensing data effecting the manufacturing using the plurality of sensors to provide real-time feedback including real-time feedback regarding location of each of the first motion system, the second motion system, and the third motion system;
controlling manufacturing using the apparatus using the data such that control is provided in real-time and for multiple axes of motion and synchronized motion for one or more processes performed by the first computer controlled motion system and one or more processes performed by the second computer controlled motion system and one or more processes performed by the third computer controlled motion system.

14. The method of claim 13 wherein the plurality of sensors include one or more optical sensors, laser sensors, semiconductive sensors, RF sensors, acoustic sensors or any combinations thereof.

15. The method of claim 13 wherein the second computer controlled motion system comprises a motion platform.

16. The method of claim 13 further comprising a work tool for working on the part.

17. The method of claim 16 wherein the work tool is associated with a process selected from a set consisting of an additive process, a 3D printing process, a subtractive process, a milling process, and a polishing process.

18. An apparatus comprising:
a first gantry comprising a rigid frame or girder system;
a first computer controlled motion system including the first gantry and configured to move in coordinated positions;
a second computer controlled motion system comprising a motion platform holding a part to be worked on and configured to move in coordinated positions;
a third computer controlled motion system including a second gantry, the first gantry holding the second gantry;
a plurality of sensors associated with the first motion system and the second motion system and the third motion system;
at least one controller operatively connected to the first computer controlled motion system, the second computer controlled motion system, and the third computer controlled motion system;
wherein the at least one controller is configured to use information from the plurality of sensors to assist in coordination between the first computer controlled motion system, the second computer controlled motion system, and the third computer controlled motion system;
wherein the at least one controller is configured to use the information from the sensors to locate the first computer controlled motion system in real-time;
wherein the at least one controller is configured to use the information from the sensors to locate the second computer controlled motion system in real-time;
wherein the at least one controller is configured to use the information from the sensors to locate the third computer controlled motion system in real-time;
wherein if the first computer controlled motion system is out of position based on the location of the first computer controlled motion system as determined by the at least one controller, the first computer controlled motion system is configured to move itself back into a desired position for the first computer controlled motion system;
wherein if the second computer controlled motion system is out of position based on the location of the second computer controlled motion system as determined by the at least one controller, the second computer controlled motion system is configured to move itself back into a desired position for the second computer controlled motion system;
wherein if the third computer controlled motion system is out of position based on the location of the third computer controlled motion system as determined by the at least one controller, the third computer controlled motion system is configured to move itself back into a desired position for the third computer controlled motion system;
a work tool for working on the part, wherein the work tool is associated with a 3D printing process.

* * * * *

UNITED STATES PATENT AND TRADEMARK OFFICE
CERTIFICATE OF CORRECTION

PATENT NO. : 10,162,339 B2
APPLICATION NO. : 15/093871
DATED : December 25, 2018
INVENTOR(S) : Kenneth H. Church et al.

Page 1 of 1

It is certified that error appears in the above-identified patent and that said Letters Patent is hereby corrected as shown below:

In the Claims

Column 7, Claim 13, Line 6, change "pantry" to --gantry--

Column 7, Claim 13, Line 10, change "pantry" to --gantry--

Column 7, Claim 13, Line 11, change "pantry" to --gantry--

Column 7, Claim 13, Line 12, change "pantry" to --gantry--

Signed and Sealed this
Twelfth Day of March, 2019

Andrei Iancu
*Director of the United States Patent and Trademark Office*